United States Patent [19]

Yamazaki

[11] 4,072,247
[45] Feb. 7, 1978

[54] LIQUID DISPENSING DEVICE

[75] Inventor: Seichi Yamazaki, Kashiwa, Japan

[73] Assignee: Nippon Glass Measure Co., Ltd., Tokyo, Japan

[21] Appl. No.: 699,575

[22] Filed: June 24, 1976

[30] Foreign Application Priority Data

Feb. 19, 1976 Japan .............................. 51-18597[U]

[51] Int. Cl.² .............................................. B67D 5/22
[52] U.S. Cl. ..................................... 222/47; 222/309; 222/383; 73/425.4 P
[58] Field of Search ....................... 222/23, 41, 43, 47, 222/49, 50, 309, 372, 383, 384; 73/425.4 P; 92/13.41

[56] References Cited

U.S. PATENT DOCUMENTS

| 2,976,844 | 3/1961 | Goldring | 92/13.41 |
| 3,653,556 | 4/1972 | Moran et al. | 222/309 |
| 3,940,027 | 2/1976 | Marterer | 222/309 |
| 4,003,499 | 1/1977 | Shapiro et al. | 222/309 X |

Primary Examiner—Robert B. Reeves
Assistant Examiner—Joseph J. Rolla
Attorney, Agent, or Firm—James E. Nilles

[57] ABSTRACT

A liquid dispensing device comprising a cap structure mounted on a liquid container, a cylinder extending vertically upward from the cap structure, a manually operable plunger slidable within the cylinder, an adjustment assembly for controlling the stroke of the plunger, and a discharge assembly and suction assembly respectively incorporating one-way valves therein and removably fitted in respective bores in the cap structure.

11 Claims, 7 Drawing Figures

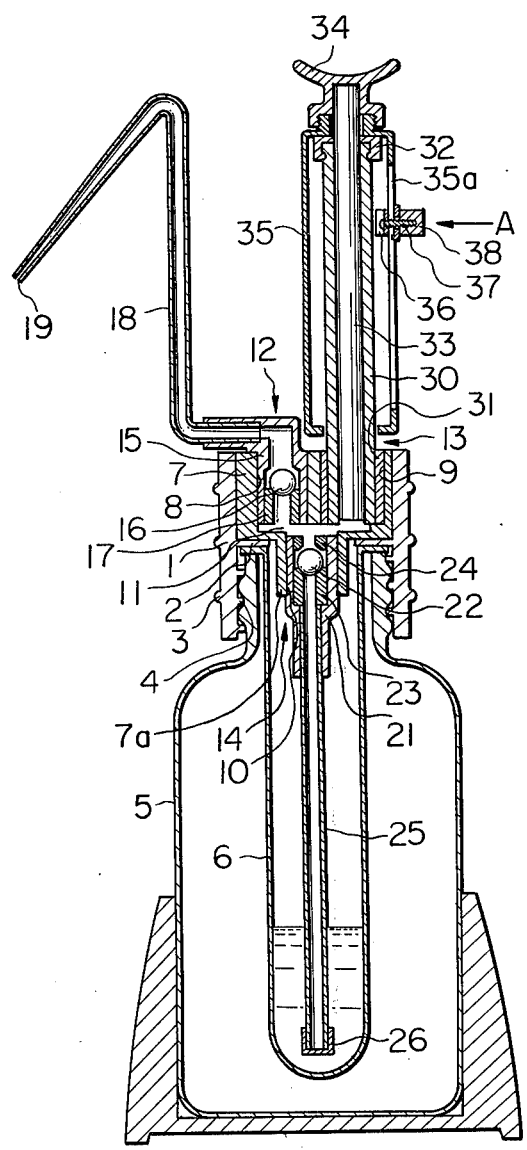
Fig. 1
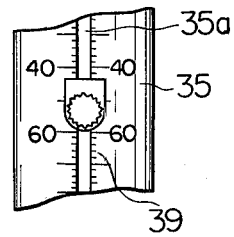
Fig. 2
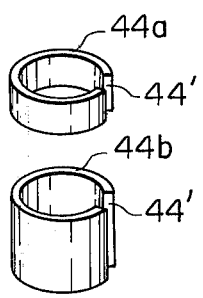
Fig. 4a
Fig. 4b

LIQUID DISPENSING DEVICE

BACKGROUND OF THE INVENTION

This invention relates generally to liquid dispensing devices for accurately dispensing qualities of liquid of the kind usually called as a pipette type.

Liquid dispensing devices of the kind as heretofore proposed have shortcomings such that it has been difficult to perform cleaning operation which is required to utilize the device in dispensing different liquids or to maintain the device in good condition during a relatively long storage according to the complicated construction.

Further, according to the prior art liquid dispensing devices, it has been difficult to meter the amount of liquid discharged in each operation precisely since the amount has been determined by a relatively rough scale.

SUMMARY OF THE INVENTION

An object of the present invention is to provide a liquid dispensing device which can easily be disassembled into several sub-assemblies and can easily be assembled to a complete assembly. Thus, it becomes very easy to perform cleaning operation and, moreover, when failure is occured in any of the subassemblies it is very easy to restore the function of the device by exchanging the specified subassembly by a new one.

Further, according to one feature of the present invention the amount of discharge can precisely and rapidly be determined by incorporating one or more inserts selected from a series of inserts each having a predetermined thickness in the device such that the insert or the inserts are associated with a plunger to control the stroke of the plunger.

These and further objects and effects of the present invention will be more apparent from the following description taken in conjunction with the accompanying drawings which are illustrative of preferred embodiments of the present invention.

BRIEF DESCRIPTION OF THE DRAWINGS

FIG. 1 is a cross-sectional view of a liquid dispensing device according to the present invention;

FIG. 2 is a partial side view as viewed in the direction of arrow A in FIG. 1;

FIGS. 4a and 4b are perspective views of gauge members;

DESCRIPTION OF THE PREFERRED EMBODIMENT

Figure 3:
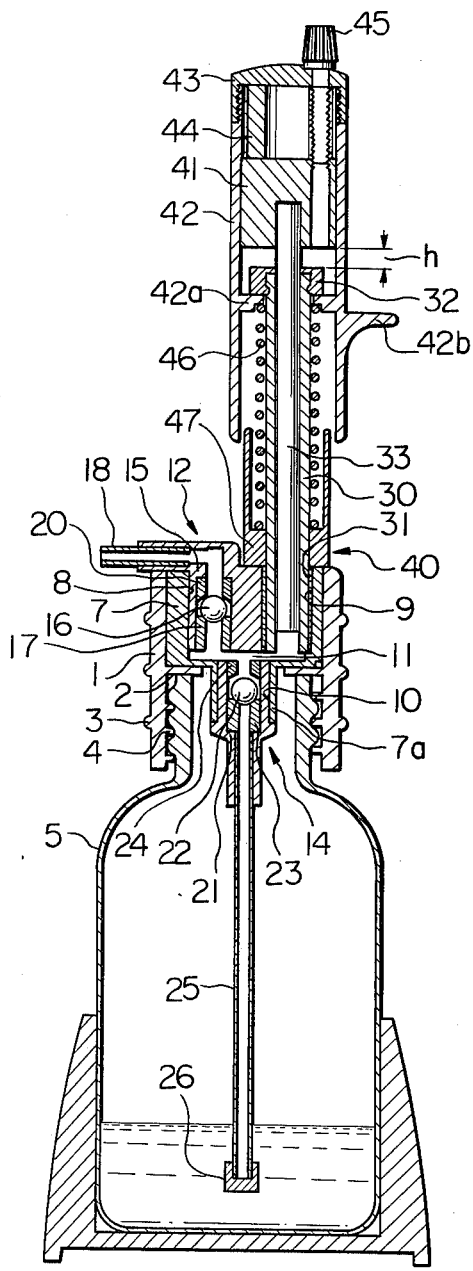
FIG. 3 is a partially broken cross-sectional view of a modified form of the liquid dispensing device according to the present invention.
Figure 5:
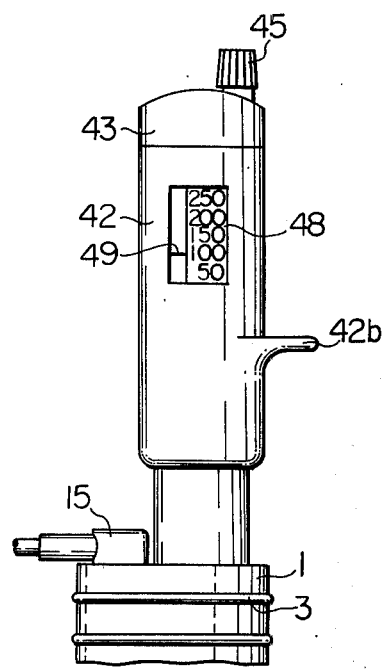
FIG. 5 is a partial side view of the device of FIG. 3.

The liquid dispensing device shown in FIG. 1 comprises a cap structure which is formed preferably of synthetic resin such as polypropylene and consists of a generally cylindrical outer body 1 and an inner body 7. A partition 2 is formed at the intermediate portion of the interior of the outer body 1 to define an upper portion for receiving the inner body 7 and a lower portion for mounting the device on the top of a liquid container 5. The lower portion of the outer body 1 has internal screw thread 4 for screw threadingly engaging with the container 5. In the embodiment a small tube 6 is clamped between the partition 2 and the container 5 for containing small amount of liquid therein. A plurality of annular ridges 3 are formed on the outer periphery of the outer body 1 for affording non-skid effect in handling the device.

The inner body 7 is formed separately of the outer body 1 and secured thereto, but it may be formed integral with the outer body 1. A projection 7a of the inner body 7 extends downwardly through a central opening of the partition 2. The inner body 7 has vertical blind bores 8, 9 and 10 as shown in the drawing and the inner ends of respective bores communicate with each other through a passage 11.

The bores 8 and 10 are adapted to removably receive respectively an outlet or delivery assembly 12 and an inlet or suction assembly 14 respectively, and the bore 9 is adapted to receive a cylinder assembly 13.

The delivery assembly 12 comprises a body 15 incorporating a one-way delivery valve consisting of a ceramic ball 16 and a valve seat 17, and a generally Z shaped delivery tube 18 defining a nozzle 19 at the tip end thereof.

The inlet or suction assembly 14 comprises a body 21 incorporating a one-way suction valve consisting of a ceramic ball 22, a valve seat 23 and a retainer 24, and a suction tube 25 having a filter 26 at the lower end thereof.

The valve seat 17 of the delivery assembly 12 is fitted and secured in a bore formed in the body 15 such that a predetermined small amount of clearance, e.g. 0.10–0.15 mm, is provided between the valve seat 17 and the ball 16 when the valve is in full open condition. The inventor has found that the operational characteristic of the valve can substantially be improved by restricting the movement of valve ball to a predetermined small amount whereby the liquid dispensing device can dispense a desired small amount liquid precisely. When the clearance or the stroke of the valve ball is excessive, it tends to delay the closing time of the valve, and when the valve ball is urged to the seat by a spring it tends to delay the opening time of the valve and to quicken the closing time of the valve, which will cause error in the amount of delivered liquid.

Further, the delivery and suction assemblies 12 and 14 are removably fitted in the bores of the cap structure, it is very easy to clean the assemblies separately without the necessity of returning the same to the manufacturer, and which enables to maintain the function of the valves from foreign materials such as sediment.

The cylinder assembly 13 comprises a glass cylinder 30 the lower end of which is fitted in the bore 9 of the cap structure disposing a suitable seal or packing 31 therebetween and having a stop member 32 at the upper end thereof. In the embodiment, the cylinder 30 is tightly fitted and secured to the cap structure 1, 7, but it may be removably mounted to enable easy cleaning of the device or to change the cylinder assembly 13 with cylinder assembly of other type, e.g. of a different capacity. The stop member 32 is formed of synthetic resin such as polypropylene and is secured to the cylinder 30 by engaging with an annular groove of the cylinder 30 as shown, but it may be formed integral with the cylinder 30.

A plunger 33, preferably formed of ceramic, is slidably fitted in the cylinder 30. The plunger 33 carries a suitable handle 34 on the upper end thereof and a generally cylindrical sleeve 35 surrounding the outer periphery of the cylinder 30 with a space therearound. A vertically extending slot 35a is formed along one side of the sleeve 35. An abutment member 36 is mounted adjustably along the slot 35a on the inner surface of the sleeve 35 by a screw 37 and a knob 38. The abutment member 36 is adapted to engage with the lower end of the stop member 32 to restrict the upward movement of the plunger 33 relative to the cylinder. A scale 39 is provided along the slot 35a as shown in FIG. 2 to indicate the amount of liquid to be dispensed by reciprocating the plunger within the cylinder.

The embodiment shown in FIG. 3 is generally similar to that of FIG. 1 and the corresponding parts are denoted by similar reference numerals.

In FIG. 3, the cylinder assembly 13 is substituted by cylinder assembly 40 which comprises a sleeve 42 slidably receiving an increased diameter head 41 of the plunger 33, and extending downward around the periphery of the cylinder 30. The sleeve 42 is urged upward by a coil spring 46 which acts between an annular projection 42a formed on the inner periphery of the sleeve 42 and a protecting sleeve 47 mounted on the cap structure as shown in the drawing, thereby the annular projection 42a normally abuts against the lower end of the stop member 32 secured to the cylinder 30 to restrict the upward movement of the sleeve 42 relative to the cylinder 30.

The upper end of the sleeve 42 is closed by a cap 43. A gauge member 44 according to one of the features of the present invention is clamped between the cap 43 of the sleeve 42 and the head 41 of the plunger 33 by a set screw 45 which passes through an opening formed in the cap 43 and a cut-out portion 44' of the gauge member 44 (FIGS. 4a and 4b) and engages screw threadingly with the head 41, thus securing the plunger 33 with the sleeve 42. The gauge member 44 is preferably formed of ceramic and has generally C-shaped configuration as shown in FIGS. 4a and 4b, and is selected from a series of gauge members 44a, 44b, . . . having similar configuration and each having a predetermined thickness, so that a predetermined clearance h corresponding to the thickness of the gauge member 44 will be formed between the lower end of the head 41 of the plunger 33 and the upper surface of the stop member 32 of the cylinder 30 when the sleeve is in its normal uppermost position. Thus, the stroke of the plunger 33 defined by the clearance h can be controlled by the gauge member 44 with high accuracy.

A radially projecting handle 42b is formed on the outer periphery of the sleeve 42, and a scale 48 cooperating with an index 49 is provided on the sleeve 42. The index 49 is preferably a line formed on the outer periphery of the head 41 of the plunger 33.

In the embodiment, a retainer 20 formed of a material same or different from the body 15 of the delivery assembly 12 and fitted and secured into a bore of the body 15. By locating the ball 16 between the retainer 20 and the valve seat 17, it becomes easy to afford a small predetermined amount in the clearance or the stroke of the ball 16.

Figure 6:
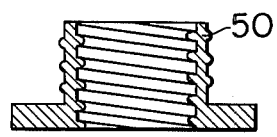
FIG. 6 is a cross-sectional view of an adapter.

FIG. 6 shows an adapter 50 having external screw thread for engaging with screw thread 4 of the cap structure 1 and internal screw thread for engaging a liquid container having a capacity smaller than that of the container 5. The adapter 50 can improve the applicability of the liquid dispensing device.

The liquid dispensing devices according to the present invention having construction as heretofore described can dispense a desired amount of liquid at a high accuracy and it is possible to maintain the desired function for long time of usage. Incidentally, the operation of the devices has not been described in detail, but it will be self-explanatory for those skilled in the art from reading the description of the detailed construction relating to the drawings.

What is claimed is:

1. A liquid dispensing device comprising a cap structure adapted to be mounted on the top of a liquid container, a cylinder extending vertically upward from the cap structure, a manually operable plunger slidably fitted in the cylinder, means for controlling the stroke of the sliding movement of the plunger within the cylinder, a delivery assembly including a one-way delivery valve and a delivery nozzle, and a suction assembly including a one-way suction valve and a suction tube extending into the liquid in the liquid container, said delivery assembly and suction assembly being respectively removably force fitted into respective bores formed in the upper portion and the lower portion of the cap structure, said bores communicate with each other and with the interior of said cylinder, said stroke controlling means comprising a head of increased diameter formed on the upper end of the plunger for engaging with the upper end of the cylinder to prevent the downward movement of the plunger, a sleeve receiving the head of the plunger slidably therein, one or more gauge members being selected from a series of gauge members each having a predetermined thickness and being located and clamped between the head of the plunger and a cap member closing the upper end of the sleeve, and a projection formed on the inner periphery of the sleeve for cooperating with a stop member formed on the cylinder to restrict the upward movement of the sleeve relative to the cylinder.

2. A liquid dispensing device as set forth in claim 1 wherein a coil spring is disposed between the cap structure and the sleeve to urge the sleeve upwardly relative to the cylinder.

3. A liquid dispensing device as set forth in claim 1 wherein the head of the plunger, the selected gauge member and the cap member of the sleeve are clamped together by a set screw which passes through openings formed in the cap member and the gauge member and threadingly engages with the head of the plunger.

4. A liquid dispensing device as set forth in claim 1 wherein a radially extending lug is formed on the outer periphery of the sleeve to act as an operating handle.

5. A liquid dispensing device as set forth in claim 1 wherein a window is formed in the circumference of said sleeve for attaining visual indication of the thickness of the selected gauge member or the quantity of liquid which will be discharged by operating the device.

6. A liquid dispensing device as set forth in claim 1 wherein a liquid containing bottle having a capacity substantially smaller than that of the liquid container is adapted to be mounted on the lower portion of the cap structure.

7. A liquid dispensing device as set forth in claim 1 wherein the lower portion of the cap structure has internal screw thread for threadingly engaging with external screw thread formed on the neck portion of the liquid container.

8. A liquid dispensing device as set forth in claim 1 wherein a generally cylindrical adapter having external screw thread for engaging with the internal screw thread of the cap structure and internal screw thread for engaging with external screw thread formed on the neck portion of a liquid container is adapted to mount a liquid containing bottle substantially smaller than the liquid container on the lower portion of the cap structure.

9. A liquid dispensing device as set forth in claim 1 wherein the cylinder is removably force-fitted in a bore of the cap structure.

10. A liquid dispensing device as set forth in claim 1 wherein each of the one-way delivery and suction valves comprises a ball of ceramic material.

11. A liquid dispensing device as set forth in claim 10 wherein balls of said one-way valves have respectively strokes of predetermined small amount.

* * * * *